United States Patent
Saliba

[11] Patent Number: 6,040,964
[45] Date of Patent: Mar. 21, 2000

[54] METHOD AND APPARATUS FOR MULTIPLE CHANNEL HEAD ASSEMBLY

[75] Inventor: George Saliba, Northborow, Mass.

[73] Assignee: Quantum Corporation, Milpitas, Calif.

[21] Appl. No.: 08/899,082

[22] Filed: Jul. 23, 1997

Related U.S. Application Data

[63] Continuation of application No. 08/507,618, Jul. 26, 1995, abandoned.

[51] Int. Cl.[7] .............................. G11B 5/255; G11B 5/265
[52] U.S. Cl. ............................................. 360/121; 360/122
[58] Field of Search ..................... 360/119, 120, 360/121, 122, 123, 125, 126

[56] References Cited

U.S. PATENT DOCUMENTS

| | | | |
|---|---|---|---|
| 3,807,042 | 4/1974 | Braitberg et al. | 360/121 |
| 3,851,375 | 12/1974 | Koorneef | 360/121 |
| 4,695,909 | 9/1987 | Momata et al. | 360/121 |
| 4,996,609 | 2/1991 | Joannou | 360/121 |
| 4,999,904 | 3/1991 | Nanjyo et al. | 360/121 |
| 5,055,959 | 10/1991 | Saliba | 360/122 |
| 5,063,468 | 11/1991 | Best | 360/121 |
| 5,218,493 | 6/1993 | Jeffers | 360/121 |
| 5,220,473 | 6/1993 | Brock et al. | 360/121 |
| 5,426,551 | 6/1995 | Saliba | 360/122 |

FOREIGN PATENT DOCUMENTS

| | | | |
|---|---|---|---|
| 1112823 | 3/1956 | France | 360/121 |
| 2209781 | 9/1972 | Germany | 360/121 |
| 56-159805 | 12/1981 | Japan | 360/121 |
| 59-30229 | 2/1984 | Japan | 360/121 |

OTHER PUBLICATIONS

IBM Tech. Dis. Bulletin, "Ferrite Magnetic Head", Brock et al, vol. 23, No. 7A, Dec. 1980, p. 2972.

IBM Tech. Disclosure Bulletin, "Multiple Track Recording Head", Reich, vol. 8, No. 10, Mar. 1966, p. 1317.

*Primary Examiner*—David L. Ometz
*Attorney, Agent, or Firm*—John C. Chen

[57] ABSTRACT

A multiple channel magnetic tape head assembly defines a plurality of spaced-apart transducer elements along an integral bar of ferromagnetic material. Each element, formed by grinding operations performed upon the integral bar, has a magnetic gap and flux circuit which is isolated from cross-talking with the other elements. Each element is precisely located by the integral bar, portions of which remain after grinding. The head assembly provides an aligned longitudinal tape wear region and may further provide widened transverse wear regions adjacent to each of the transducer elements. A fabrication method for forming a multiple channel magnetic tape head assembly is also described.

4 Claims, 8 Drawing Sheets

METHOD AND APPARATUS FOR MULTIPLE CHANNEL HEAD ASSEMBLY

This is a continuation of application Ser. No. 08/507,618 filed Jul. 26, 1995, now abandoned.

FIELD OF THE INVENTION

The present invention relates generally to the field of magnetic recording and playback of digital information from a storage medium. More particularly, the present invention relates to a method for forming an array of magnetic read/write head elements from a unitary core bar, and a resultant head assembly structure.

BACKGROUND OF THE INVENTION

More and more critical information is being committed to computers, causing storage capacity to increase at a startling rate. The expansion of data storage requirements has fueled a need for better, more cost-effective tape backup solutions that feature high capacity, high performance and exceptional data integrity.

In the past, helical scan tape technology provided an acceptable solution for mid-range and low-end tape backup systems. Growing demands of contemporary data-intensive applications are quickly outpacing helical scan tape drive capabilities. One technology offering capacity, transfer rate and storage capacity gains over helical scan tape drives, is digital longitudinal streaming tape drives.

Longitudinal tape drives run the tape past a plurality of stationary heads at e.g. 100 to 150 inches per second during read/write data transfer operations, and faster during block searching. These drives place data in plural longitudinal tracks in comparison with slanted stripes of helical scan technology. Since the tracks are arranged longitudinally along the tape, additional recording tracks and channels enable parallel read/write data transfer operations, thereby increasing data transfer rates.

A longitudinal linear tape drive head assembly includes a pair of longitudinal channels. Within each channel, a read or verify head is spanned on each side by a write head, so that data may be read immediately after being written in order to verify the integrity of the data transfer operation, irrespective of direction of tape travel relative to the head. Typically the three heads of each channel are arranged in transverse alignment relative to a longitudinal axis of the tape within a head structure in contact with the tape as it streams past in one direction or the other during operation. One example of a prior head structure for use with digital longitudinal magnetic tape is provided by the present inventor's commonly assigned U.S. Pat. No. 5,055,959 entitled: "Tape Head with Low Spacing Loss Produced by Narrow and Wide Wear Regions", by commonly assigned U.S. patent application Ser. No. 08/094,413 filed on Jul. 19, 1993, for "Magnetic Tape Head", and by commonly assigned U.S. patent application Ser. No. 08/305,117, filed on Sep. 13, 1994, for "Magnetic Tape Head with Self-Regulating Wear Regions", the disclosures thereof being incorporated herein by reference thereto.

Conventional digital longitudinal tape head structures have heretofore typically included a number of discrete read/write core elements. Each core element must be located normally at a very precise location within the head structure in order to achieve desired multi-channel high track density recording within each tape and from tape to tape as tapes are exchanged on the tape drive mechanism. One significant drawback with conventional longitudinal tape heads is that the discrete read/write core elements were separately machined and assembled in place in precise alignment For example, the Quantum DLT6000 linear digital tape head structure requires some 48 miniature spacers and 12 individual cores, along with a multiplicity of islands and shields. All of these discrete elements had to be aligned precisely in place prior to various attachment/bonding procedures in assembly of the head structure, leading to high component and assembly costs.

Another prior approach has been to fabricate tape head elements in a row by using thin film techniques to deposit inductive write elements and magnetoresistive read elements. In this approach plural thin film write/read elements are deposited by thin film techniques upon a suitable wafer substrate. Each of the layers forming the elements is deposited under tight positional tolerances with respect to channel or track spacing, thereby eliminating need for subsequent aligning. The wafer is further processed and sliced into bars, with each bar containing a number of prearranged thin film write/read elements. However, the wafer process typically does not make efficient use of the surface area of the wafer and therefore minimizes the number of heads that may be fabricated upon a single wafer in a very capital intensive, expensive manufacturing process. Thus, while the thin film deposition method has eliminated some of the alignment issues during head assembly, its limited production yields and high capital manufacturing costs have restricted the use of this advanced magnetic recording technology to very high priced tape drive systems, such as the IBM 3480/90 streaming tape systems.

Thus, a hitherto unsolved need has remained for a low cost precision multiple head and manufacturing process for digital longitudinal tape recording systems.

SUMMARY OF THE INVENTION WITH OBJECTS

One object of the present invention is to form precision-aligned multiple read or write elements from a single bar of magnetic core material in a manner overcoming limitations and drawbacks of the prior art.

Another object of the present invention is to provide a ganged head formation method for a multiple channel linear tape recording and playback system in a manner realizing self alignment, efficient use of materials and low manufacturing and prime costs.

A further object of the present invention is to provide a multiple head assembly formed out of an integral bar of magnetic core material in a manner providing prearranged track spacing and alignment of the individual head elements.

One more object of the present invention is to provide a plural read/write element assembly having a unitary core structure in a manner minimizing magnetic cross-coupling between individual head elements of the assembly.

Yet another object of the present invention is to provide a multiple channel head assembly for a longitudinal tape storage system which employs conventional materials and manufacturing processes in order to realize a head assembly having inherently aligned read/write head elements at relatively low finished-product and manufacturing costs, with higher yields than hitherto obtained with more expensive thin film head technologies.

In accordance with one aspect of the present invention, a magnetic recording head assembly comprises a core-bar of ferromagnetic core material having a longitudinal axis; the core-bar defining a plurality of spaced-apart magnetic transducer elements, each element including:

a first pole segment defining a pole tip,
   a second pole segment having a pole tip oppositely facing the pole tip of the first pole segment and separated by a narrow magnetic gap,
   the magnetic gap between the pole tips being substantially aligned with the longitudinal axis of the core-bar and being filled with an insulative material, and
   a coil of wire wound around at least one of the first and second pole segments,
the assembly further including structure defining longitudinal wear regions extending between the plurality of spaced-apart magnetic transducer elements.

In a further aspect of the present invention, a method of fabricating a magnetic recording head assembly comprising a plurality of precisely aligned, spaced apart magnetic transducer elements, comprises the steps of:
   forming two elongated core-bars of ferromagnetic material so that each defines a longitudinal channel and so that the resultantly formed two core-bars have facing longitudinal edges aligned,
   forming a plurality of aligned magnetic gap regions along one pair of oppositely facing edges of the formed elongated core-bars thereby rendering adjacent portions of the core bars as magnetic pole tips of the plurality of magnetic transducer elements,
   joining the two formed elongated core-bars together into an elongate box structure by a non-ferromagnetic joinery medium along the aligned longitudinal edges including placement of non-ferromagnetic joinery medium within each one of the magnetic gap regions,
   selectively removing portions of the elongate box structure to define at least one active pole segment extending to an included magnetic pole tip, and
   winding a coil of wire around each said active pole segment.

These and other objects, advantages, aspects and features of the present invention will be more fully understood and appreciated upon consideration of the following detailed description of a preferred embodiment, presented in conjunction with the accompanying drawings.

DETAILED DESCRIPTION OF PREFERRED EMBODIMENTS

Figure 1:
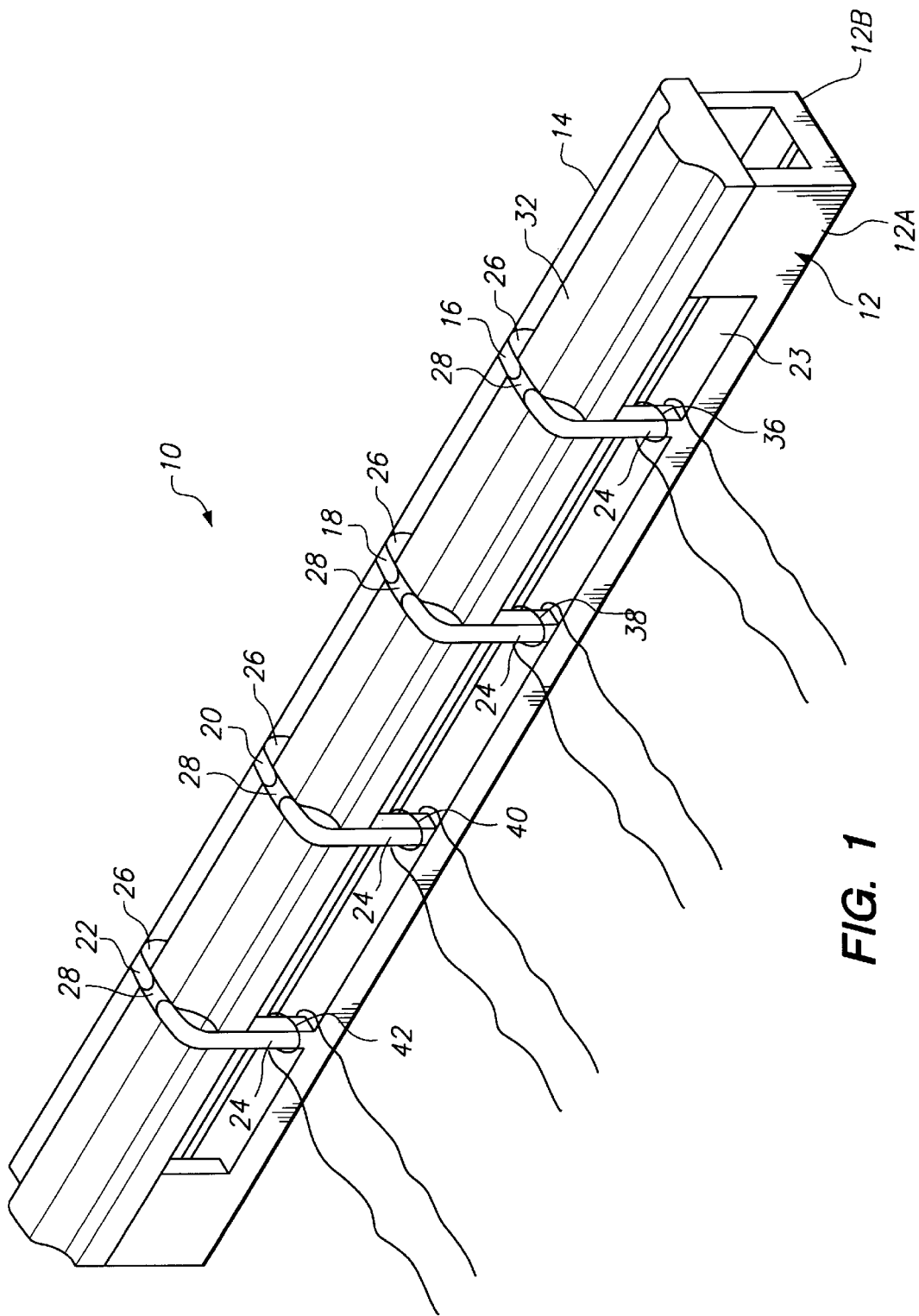
FIG. 1 is an isometric view of a first preferred embodiment of a multiple channel tape head assembly in accordance with principles of the present invention.

As illustrated in FIG. 1, a first preferred embodiment of a multiple channel tape head assembly 10 includes a shaped and processed integral core bar 12 of a suitable ferromagnetic ceramic core material, and a face-plate 14 of non-ferromagnetic material such as calcium titanate ceramic which shaped to mate with four read or write transducer elements 16, 18, 20, and 22. The elements 16, 18, 20 and 22 are formed as integral extensions of the bar 12 and extend outwardly from a back wall 23 of the bar 12.

Each magnetic head element 16–22 includes two integral pole pieces: an active pole piece 24 and a passive pole piece 26. A magnetic gap 28 is defined in each element 16–22 at an apex of the assembly as shown in the FIG. 1 orientation. Four coils of wire 36, 38, 40 and 42 are wound around each of the active pole pieces 24 of the four transducer elements 16, 18, 20 and 22, respectively.

Figure 4:
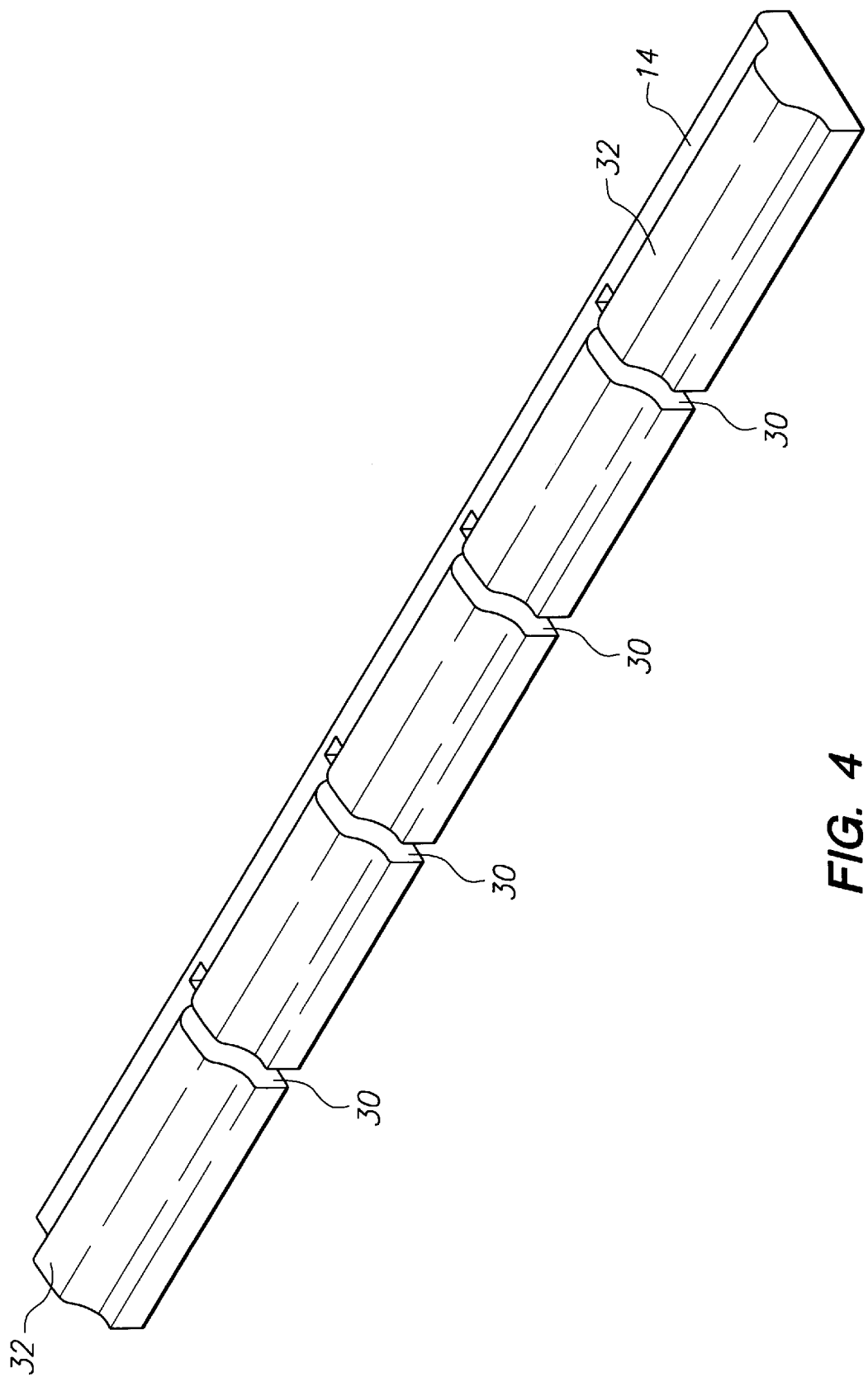
FIG. 4 is an isometric view of a tape face-plate for enclosing the FIG. 3 tape head core as shown in the FIG. 1 completed tape head assembly.

The face-plate 14 includes four slots 30 (best seen in FIG. 4) which are aligned with the four transducer elements 16–22, so that after the head assembly 10 is assembled as shown in FIG. 1, the face-plate 14 encloses and supports the four integral plateau formations comprising the four write elements 16–22. As is conventional with magnetic tape heads, the outer surfaces of transducer elements 16–22 and a longitudinally aligned portion 32 of the face-plate 14 follow a predetermined radius of curvature.

FIG. 2A illustrates initial fabrication of the core bar 12. Two rectangular bars 12A and 12B of suitable ferromagnetic core material, such as a ferrite ceramic, are ground into a three-sided C shape, in which one side is at an acute angle relative to the other two sides which are normal to each other. The bars 12A and 12B, which may be ground or machined as segments of a single bar stock, are positioned as shown in FIG. 2A, and bonded together by conventional glass bonding 13 in grooves along commonly facing upper and lower edges. Alternatively, one of the bars, such as the bar 12A may have a generally C-shaped cross section, whereas the other bar 12B may have a generally I-shaped cross section, with a resultant asymmetrical core cross section in accordance with the teachings of commonly assigned U.S. Pat. No. 5,214,553, the disclosure thereof being incorporated herein by reference.

As shown in FIG. 2A and in greater detail in FIG. 2B, before the segments 12A and 12B are glass-bonded together, the segments 12A and 12B are carefully shaped into adjacently facing, contoured pole ends 34 at the locations of the head elements 16–22, thereby defining the very narrow magnetic gap 28 separating the pole pieces 24 and 26. When the segments 12A and 12B are bonded together by glass bonding, glass 13 fills the gaps 28 and the surrounding widened areas shown in FIG. 2B. The length of the gap 28 defines the longitudinal track width, and so the gap length is made very narrow, preferably on the order of one to two mils, or less.

Figure 3:
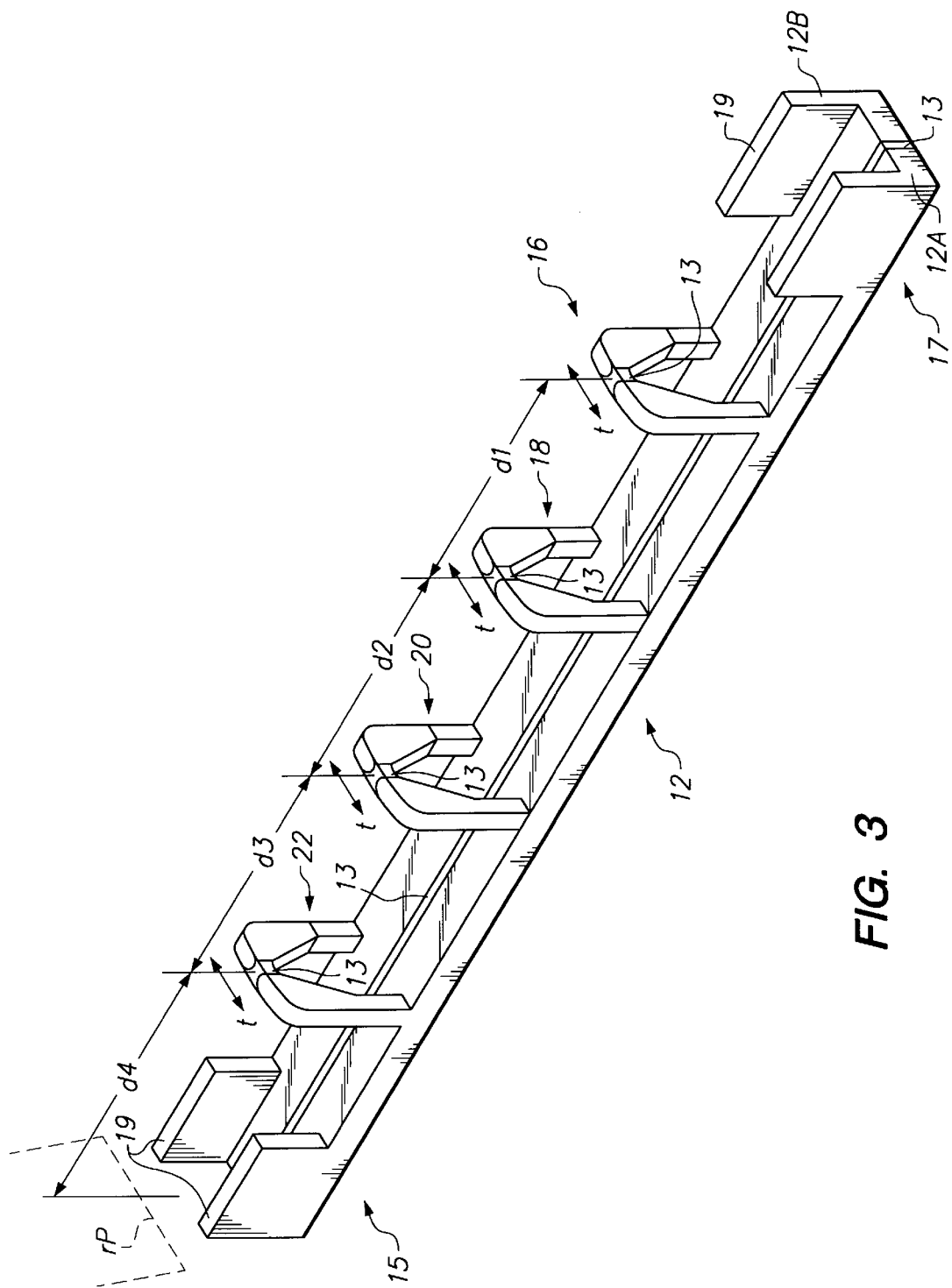
FIG. 3 is an isometric view of a multiple channel tape head core after completion of machining of the FIG. 2A core stock.

FIG. 3 illustrates the core bar 12 after further processing. In the FIG. 3 view, the core material of the bar segments 12A and 12B has been removed by grinding, leaving behind four thin plateaus defining the elements 16, 18, 20 and 22. Each element 16–22 has a longitudinal dimension on the order of about 10–20 mils. The grinding operation is carried out e.g. by use of precision gang saws and grinders of the type used to separate slider wafers into slider bars in thin film head manufacturing technology, for example. The precision machining is employed to establish precise dimensions between the head elements 16–22, thus a distance d1 separates head 16 from head 18, whereas a distance d2 separates head 18 from head 20, and a distance d3 separates head 20 from head 22, and a distance d4 separates head 22 from a fiducial reference plane rp at one end of the composite bar 12. Also, as shown in FIG. 3, a transverse gap tolerance dimension t among all of the elements 16, 18, 20, and 22 is readily maintained by virtue of the fabrication of the elements 16–22 from a single composite core bar 12, as described.

Opposite end portions 15 and 17 of the composite bar 12 are machined to provide support walls having aligned top surfaces 19 for registering and supporting the face-plate 134 after its assembly onto the composite, shaped slider bar 12. The face-plate 14 may be secured to the bar 12 by a suitable adhesive material, such as a curable epoxy resin polymer. This step serves to reinforce the thin, very delicate plateaus forming the individual cores of the integral elements 16–22 and reduce the possibility of unwanted breakage of any of the elements incident to handling during further steps of the manufacturing process.

After the face-plate 14 is secured onto the bar 12, the coils 36, 38, 40 and 42 are wound around the active pole pieces 24 of each element, also as shown in FIG. 1. After the coils 36–42 are wound, the assembly 10 is ready for encapsulation within a larger head structure, along with other, head assemblies 10 in an aligned array thereof. Encapsulation and final machining of a tape face of the head structure will leave the magnetic gap regions 28 and the curved region 32 of the face-plate 14 exposed to the tape, while other adjacent portions of the assembly 10 will become embedded in a suitable encapsulating material. Before encapsulation, connector wires are connected to each of the thin wires of the coils 36–42 to enable reliable electrical connections to be made between each element 16–22 and a corresponding external read or write channel of the tape system.

Each coil 36–42 defines a magnetic circuit extending through the pole piece 24, the back wall 13 and the pole piece 26 at the vicinity of each element 16–22, respectively. The circuit is broken at the gap 28. Therefore, during a data writing operation, a magnetic flux will be generated when current is passed through a particular coil and pass through the magnetic circuit to the gap 28 adjacent the pole tips 34. At the same time, magnetic dipoles in a track of a magnetic tape (not shown) which is passing in contact over a completed head structure will become tangentially aligned with the flux in its direction of travel across the magnetic gap 28. Conversely, during a data reading operation, passage of a data tape having a magnetization pattern across the magnetic gap of an element 16–22 will result in a current being induced in accordance with magnetic dipole orientations on the tape.

Even though a single composite core bar 12 has been used to provide the four head elements 16, 18, 20, and 22, it has been discovered that when the distances d1, d2, and d3 are sufficiently long, very little, if any, cross-talk occurs between adjacent head elements. The stray flux magnetic circuit paths between adjacent heads are too long for the heads to cross-talk by mutual coupling. Preferably, the composite core bar 12 is comprised of single crystal ferrite ceramic material. Each of the coils 36–42 is a winding having e.g. 30 turns of fine gauge wire.

Figure 2:
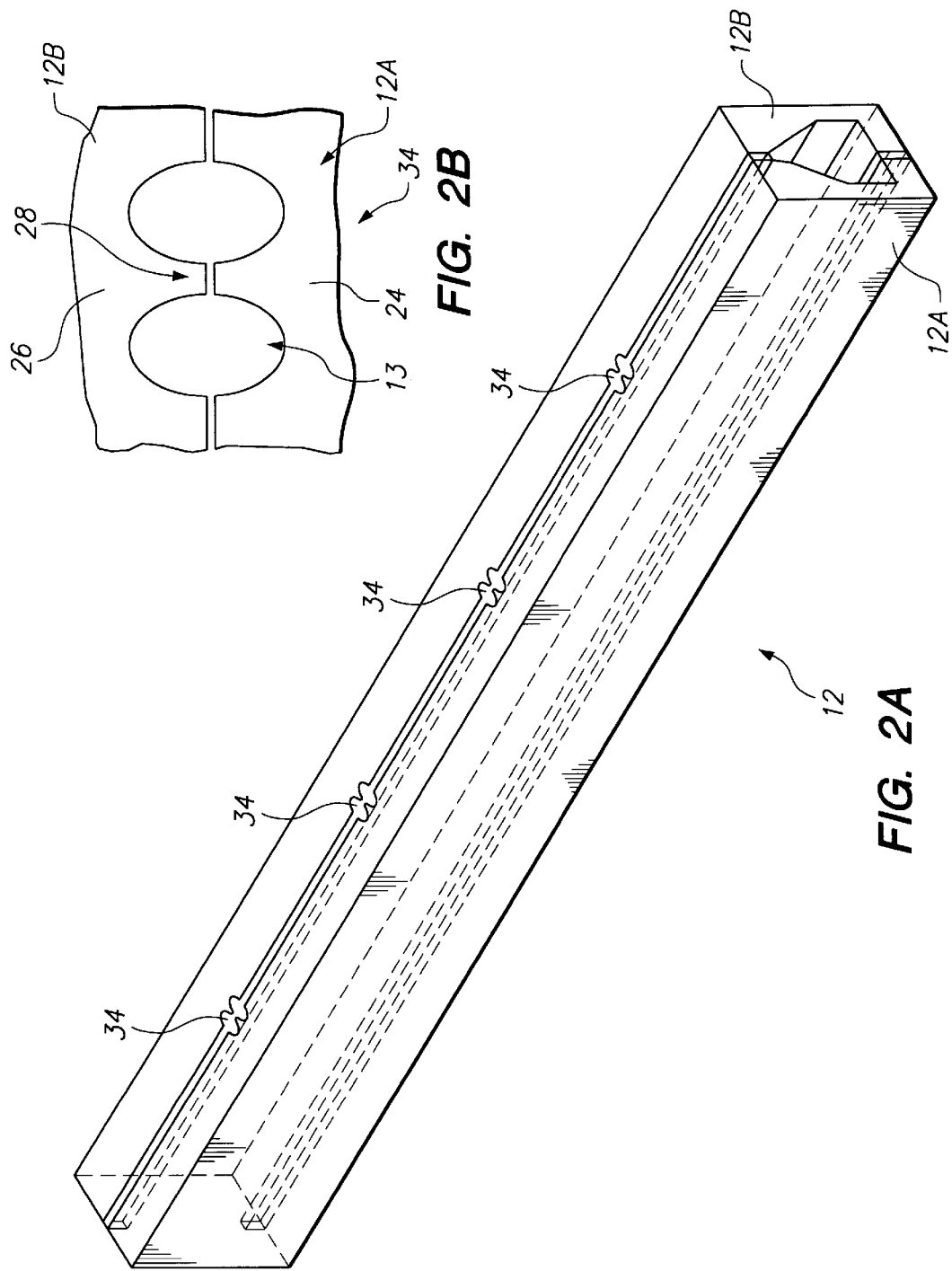
FIG. 2A is an isometric view of a shaped, generally box-shaped composite bar of ferromagnetic core stock defining an interior longitudinal pentagonal channel and other features ultimately resulting in the FIG. 1 embodiment.
FIG. 2B is an enlarged plan view of a head element region of the FIG. 2 core stock.
Figures 5, 6, 7:
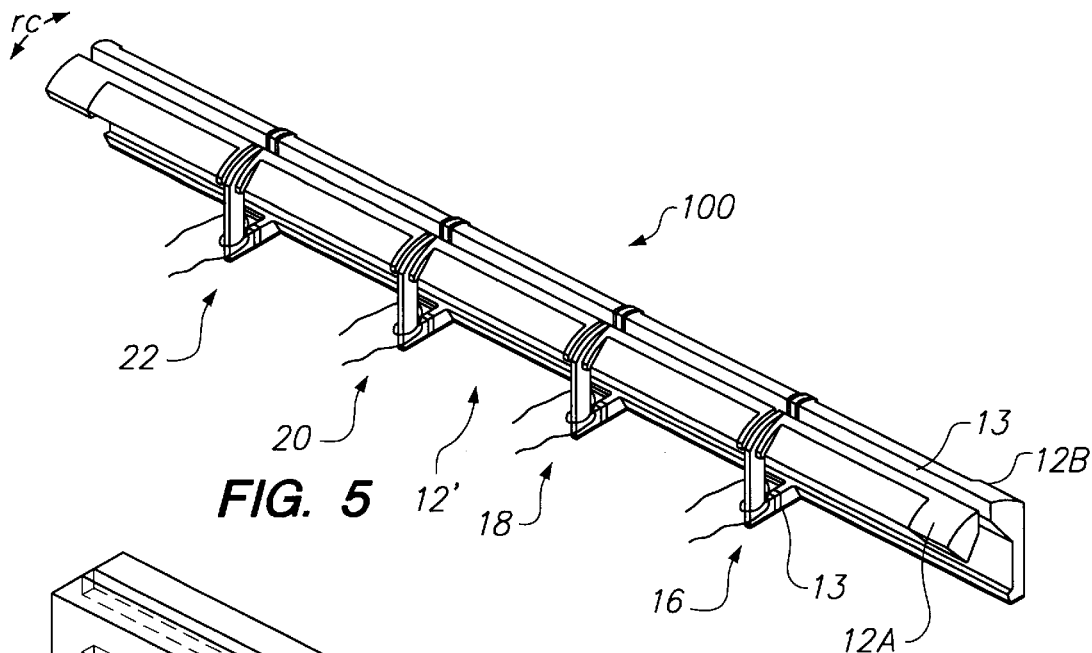
FIG. 5 is an isometric view of a second preferred embodiment of a multiple channel tape head assembly in accordance with principles of the present invention.
FIG. 6 is an isometric view of a shaped, generally box-shaped composite bar of ferromagnetic core stock defining an interior longitudinal pentagonal channel and other features ultimately resulting in the FIG. 5 embodiment.
FIG. 7 is an isometric view of the FIG. 6 composite bar following initial precision machining operations.

FIGS. 5–9B illustrate a second preferred embodiment of the present invention. In FIGS. 5–9B the same reference numerals are given to the same structural elements found in the head assembly 10 of FIGS. 1–4, and descriptions for those elements are not repeated. As shown in FIG. 6, a composite bar 12' is formed as two generally C-shaped sections 12A and 12B by longitudinal glass groove bonding techniques. However, before the glass bonding step, the narrowed head gap regions 28 are defined as shown in FIG. 2B. As noted above, the bar 12' can be formed of asymmetrical sections. In FIG. 7, the composite bar 12' is notched to form angled faces 102 and 104 on opposite sides of a longitudinal glass bond line 13. The faces 102 and 104 define widened wear regions 106 at the sites of the four head elements 16, 18, 20 and 22 and end regions 108 at respective ends of the composite bar 12'.

Figure 8:
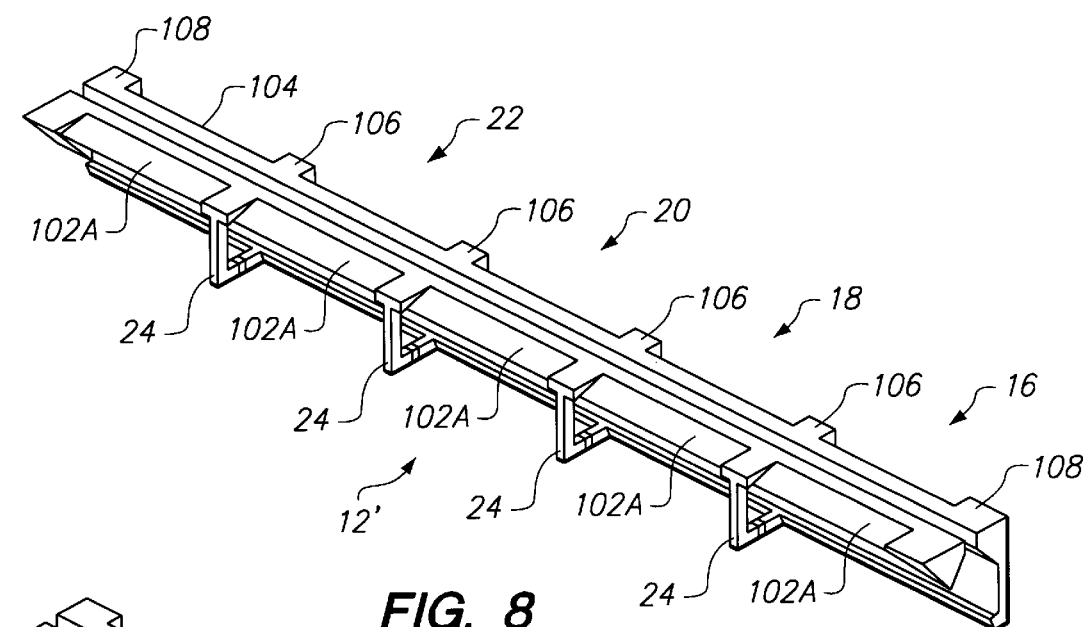
FIG. 8 is an isometric view of the FIG. 6 composite bar following further machining operations forming individual head elements.
Figure 9A:
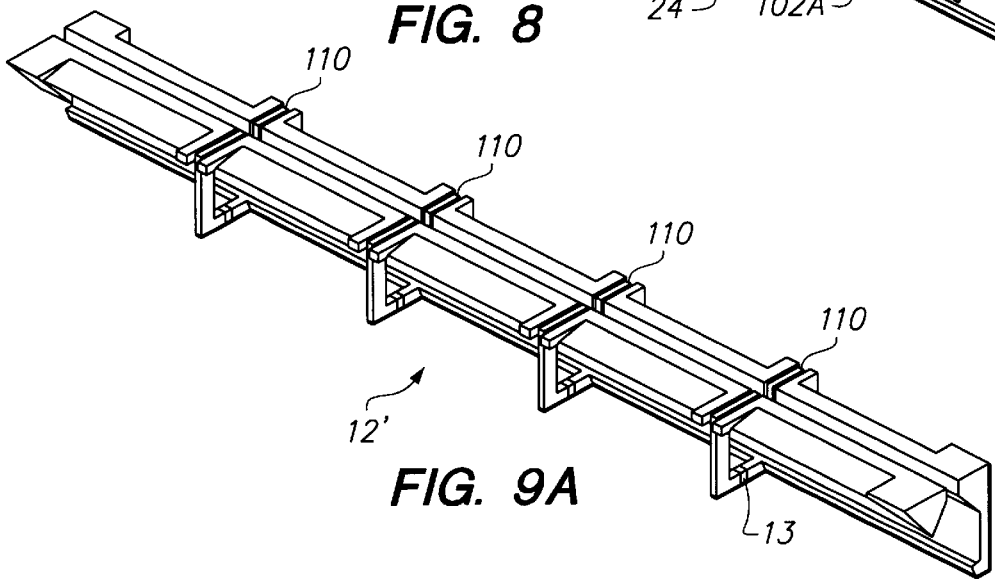
FIG. 9A is an isometric view of the FIG. 6 composite bar following completion of machining operations, but before the individual coils are wound onto the active poles of the head elements.
Figure 9B:
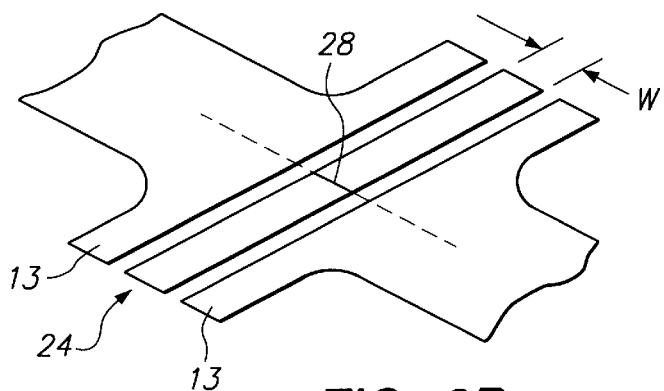
FIG. 9B is an enlarged isometric plan view of one of the multiple tape heads of the FIG. 6 composite bar following completion of machining and glass emplacement steps at the FIG. 9A state of completion in the manufacturing process.
Figure 10:
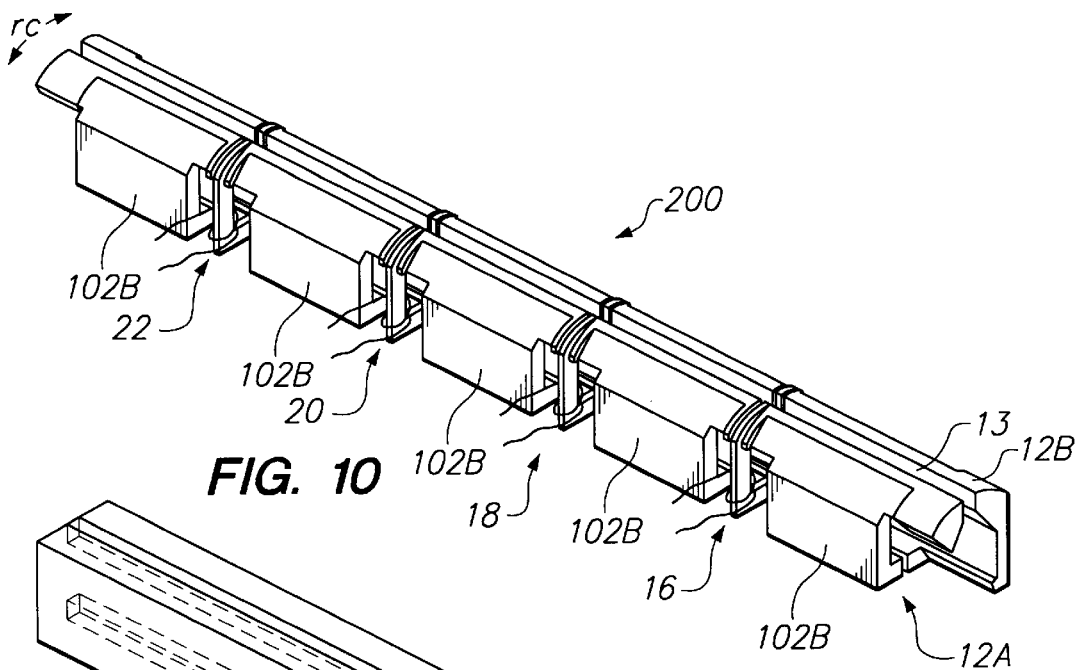
FIG. 10 is an isometric view of a third preferred embodiment of a multiple channel tape head assembly in accordance with principles of the present invention.

In a further forming step shown in FIG. 8, most of the material comprising the section 12A of the ferrite bar 12' is removed, leaving behind the active pole pieces 24 of each head element 16–22. In this example given in FIG. 8, some of the material of the segment 12B is also removed adjacent the lower longitudinal glass bond groove. The material removal step shown in FIG. 8 leaves bridging segments 102A of the segment 12A between the regions 106 and end regions 108. The widened wear regions are then grooved as at 110 in FIG. 9A and filled with glass 13 as shown in the enlarged detail view of FIG. 9A, in accordance with the teachings of U.S. Pat. No. 5,055,959 referred to above, leaving the pole ends and magnetic groove 28 intact. In the example of FIG. 9B, the width w of gap 28 may be approximately 8 mils. Returning to FIG. 5, the wire coils are wound around the respective active poles 24 of the heads 16, 18, 20 and 22, and the tape-facing surface of the composite bar 12' is ground to follow a predetermined radius of curvature denoted by the arc lines rc in FIG. 5. Thus, this second preferred embodiment avoids the use of the face-plate 14 described in conjunction with the first preferred embodiment 10.

Figure 11:
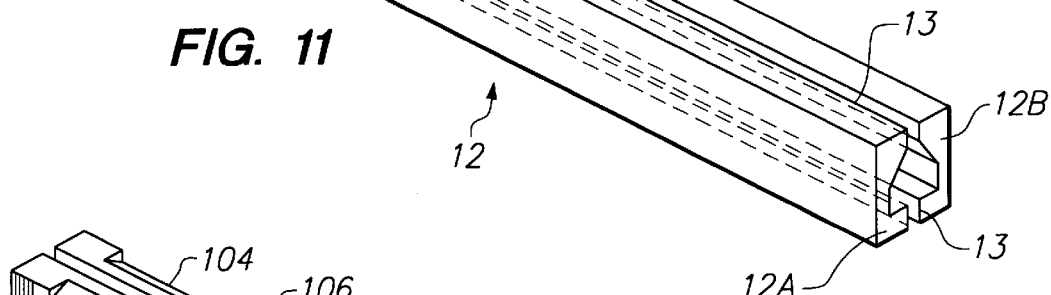
FIG. 11 is an isometric view of a shaped, generally box-shaped composite bar of ferromagnetic core stock defining an interior longitudinal pentagonal channel and other features ultimately resulting in the FIG. 10 embodiment.
Figure 12:
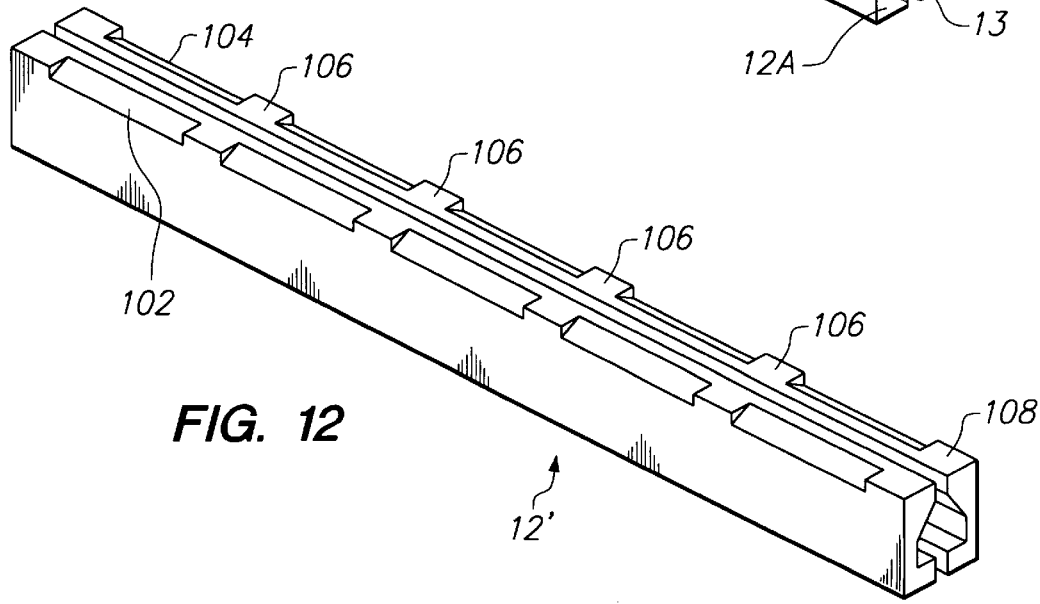
FIG. 12 is an isometric view of the FIG. 10 composite bar following initial precision machining operations.
Figure 13:
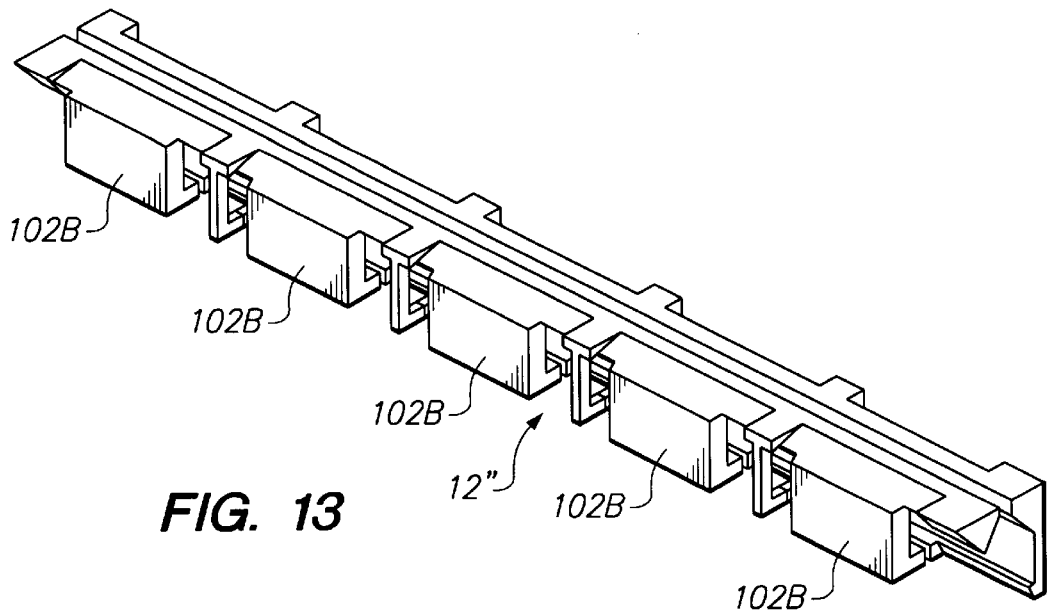
FIG. 13 is an isometric view of the FIG. 10 composite bar following further machining operations forming the individual head elements.
Figure 14A:
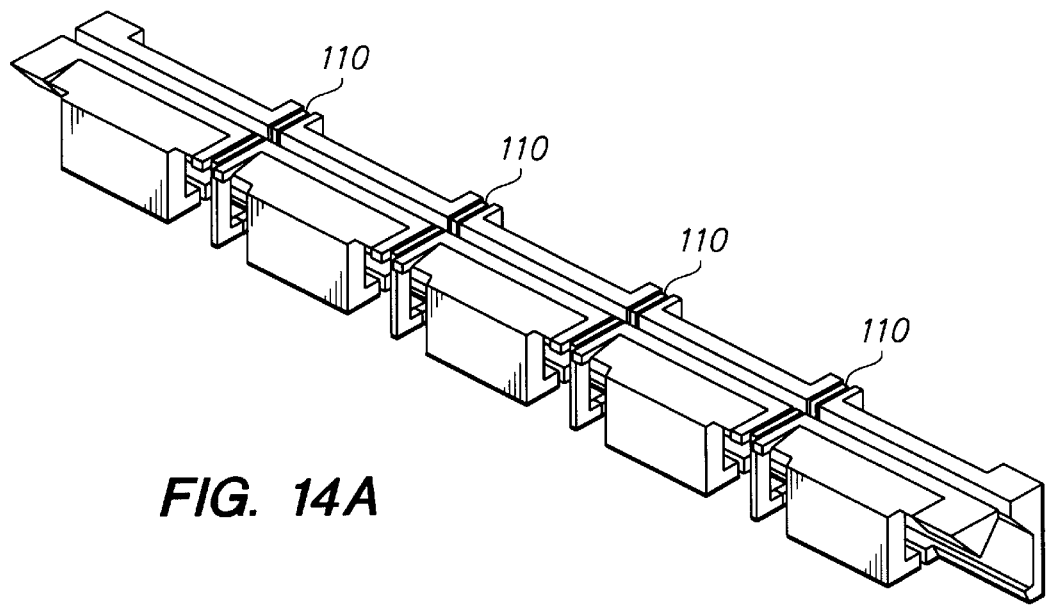
FIG. 14A is an isometric view of the FIG. 10 composite bar following completion of machining operations, but before the individual coils are wound onto the active poles of the head elements.
Figure 14B:
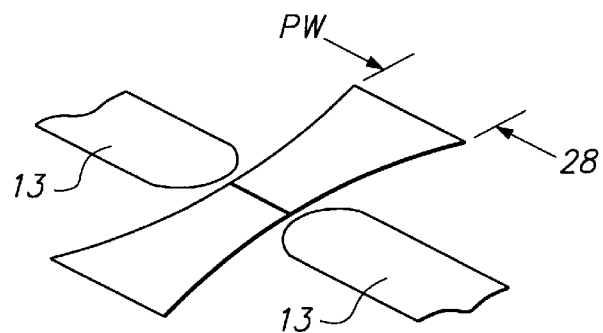
FIG. 14B is an enlarged isometric plan view of one of the multiple tape heads of the FIG. 10 composite bar following emplacement of glass at the FIG. 14 state of completion in the manufacturing process.

A third preferred embodiment 200 of the present invention is depicted in FIGS. 10–14B. In this third embodiment the composite core bar 12, shown in FIG. 11 is prepared as with the previously described examples 10 and 100. In a second machining step, shown in FIG. 12, the faces 102 and 104 are defined as per the second example 100. Subsequent machining steps, shown in FIGS. 13 and 14A are different from those shown in FIGS. 8 and 9. In FIG. 13, the bar 12' is machined to have a form 12" in which considerably larger segments 102B are left in place to provide greater structural integrity for the resultant assembly 200. Otherwise the assembly 200 is very similar to the assembly 100 described above and illustrated in FIG. 5. As shown in FIG. 14B, each head is formed as a double-concave structure which is wide, e.g. 12 mils, at the periphery pw, and narrow, e.g. 1.0 mils, at the magnetic gap 28. The arcuate patterns forming the head are preferably formed by laser ablation of the ferrite bar material.

It should be noted that heads 16, 18, 20 and 22 which are used for writing are provided with a wider gap width w (e.g. about 8 mils), than heads used for reading (e.g. gap width is about 1–2 mils). Also, the ferrite bar stock 12 is initially about 50 mils wide along its upper face. A nominal distance between the heads 16 and 18, and between heads 20 and 22 is about 54 mils, whereas a nominal distance between heads 18 and 20 is about 156 mils, in the present examples.

Having thus described preferred embodiments of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A magnetic recording head assembly comprising:

a core-bar of ferromagnetic material having a longitudinal axis;

the core bar defining a plurality of spaced apart magnetic transducer elements integrally fabricated therefrom, each said magnetic transducer element including:

a first pole segment defining a pole tip;

a second pole segment having a pole tip oppositely facing the pole tip of the first pole segment and separated by a narrow magnetic gap;

the magnetic gap between the pole tips being substantially aligned with the longitudinal axis of the core-bar and being filled with insulative material;

a coil of wire wound around at least one of the first and second pole segments;

a magnetic tape contacting structure defining longitudinal wear regions extending between the plurality of spaced-apart magnetic transducer elements, the magnetic tape contacting structure including laterally formed slots, each slot being formed between longitudinal wear regions, aligned with each transducer element, for receiving one of the transducer elements; and end portions formed at opposing longitudinal ends of the core bar, each end portion having a top surface for registering and supporting the magnetic tape contacting structure.

2. The magnetic recording head assembly set forth in claim 1 wherein the core-bar is comprised of two shaped members joined along longitudinal edges by glass bonding.

3. The magnetic recording head assembly set forth in claim 2 wherein the two shaped members each have a generally C-shaped cross section.

4. The magnetic recording head assembly set forth in claim 1 wherein the structure defining longitudinal wear regions comprises a face-plate of non-ferromagnetic material attached to the core-bar, the face-plate defining convex surfaces.

* * * * *